United States Patent [19]
Becker, Jr.

[11] 3,861,539
[45] Jan. 21, 1975

[54] BARGE COVER HANDLING SYSTEM
[75] Inventor: William F. Becker, Jr., Harahan, La.
[73] Assignee: Becker & Associates, Inc., Harvey, La.
[22] Filed: June 1, 1973
[21] Appl. No.: 366,077

[52] U.S. Cl. ................................................. 214/14
[51] Int. Cl. ............................................ B63b 27/00
[58] Field of Search...... 214/12, 13, 14, 15 R, 15 B, 214/38 CA; 114/201 R; 212/3, 18, 41

[56] References Cited
UNITED STATES PATENTS
1,440,065  12/1922  Donnelly .............................. 214/14
1,736,074  11/1929  Fontaine ........................... 214/14 X
3,307,717  3/1967   Ludwig .............................. 214/10 X
3,552,585  1/1971   Adler .................................... 214/14

Primary Examiner—Frank E. Werner
Attorney, Agent, or Firm—Holman & Stern

[57] ABSTRACT

A system for handling the covers of floating barges during loading and unloading operations is disclosed. The system includes an overhead crane which travels the length of a crane support structure having side walls which straddle the path along which the barges move during loading and unloading. Additional features of the present invention include a barge puller assembly and a continuous barge fendering assembly.

5 Claims, 8 Drawing Figures

BARGE COVER HANDLING SYSTEM

BACKGROUND AND SUMMARY OF THE INVENTION

The present invention is related to a system for use in loading and unloading barges. More particularly, the present invention concerns a system for removing the covers from a floating barge, in order that the contents of the barge may be loaded or unloaded, the system including a platform structure provided with an overhead crane which allows the removal of the barge covers and the placing of the covers on a permanently elevated barge cover storage platform, as well as the subsequent removal of the covers from the storage platform and reinstallation of the covers in proper position on the barge. A particularly important feature of the present invention is the capability for operation without regard to whether the barge is stationary or moving. Additional features of the present invention include a barge pulling assembly designed to pull the barges through the cover handling system, and a continuous fender system for guiding the barges and for preventing damage due to contact between the sides of the barges and the apparatus of the invention.

In the loading and unloading of covered barges used to transport cargo by water, an essential feature of such loading procedures is the apparatus and method employed to remove and reinstall the covers which are attached to the upper portion of the cargo hold of the barge, such covers acting as a protective shield against the elements and also serving to maintain the cargo within the confines of the cargo hold.

Previous systems for removing and reinstalling covers from floating barges have included apparatus such as a tower crane mounted in a fixed location, the crane designed to remove one cover at a time from a series of barges and place the cover on a barge or platform. The barge is required to remain stationary while the covers are being removed or replaced. Other prior art devices have been designed to remove the cover from a stationary barge and to hold the cover in a suspended position above the barge while the barge is being loaded or unloaded.

By the present invention there is provided a system for removing and reinstalling the covers from a floating barge, the system being designed to handle as many as three barge covers at one time. The apparatus includes a crane adapted for travel along a support structure which extends longitudinally so as to straddle the path along which the barges are moving. The crane employs two longitudinal girder members which travel on spaced rails or tracks set into the upper part of the entire length of the support structure. An elevated storage platform is located in the support structure for storage of the covers during loading and unloading operations.

The barge covers which are handled by the apparatus of the present invention are generally made of steel or other durable material and may weigh from 1 to 6 tons each. Each barge usually carries from eight to 12 covers. During loading and unloading operations, it is often necessary to remove two or more of the covers before the loading or unloading of the barge can begin. Also, it is common practice for the covers taken off a barge to be put back on the same barge in the original position, thus assuring the original fit of the cover to the barge. Due to the sequence of steps to be followed in loading and unloading and the speed of unloading required for economical operation, it may be necessary for the crane to be removing and replacing covers on as many as three or more barges during a given sequence of operative steps.

The present invention is designed to remove and reinstall the covers on barges such as, for example, those which carry grain, it being necessary to cover the loaded grain barges to protect the grain during transit, while the empty or unloaded barges are recovered in order to transport the covers to the location where the barges will be refilled. The present invention is well adapted for covering and uncovering operations despite changes in the height of the barges with respect to the crane, the height varying with (1) the degree to which the barge is loaded and (2) the state of the tide, i.e., whether low water or high water conditions are present.

The apparatus and method of the present invention may be employed while the barge is moving or while the barge is stationary. The crane may be operated either at a relatively slow rate in conformity with the speed of the barge or, alternatively, the crane may be operated at a high rate of speed such as, for example, when the lifting apparatus is traveling with the covers between the barge and the storage platform located in the support structure, upon which the covers are stored. Upon removal of the covers from a barge, the barge may be loaded or unloaded in an uninterrupted manner and, in the case of a moving barge, loading and unloading may be accomplished without stopping the barge. The present system can handle all of the covers from as many as three barges by removing up to three covers at one time and placing them upon the storage platform. The barge cover storage platform is located at a height such that the barges can travel underneath it.

A further aspect of the present invention concerns a barge pulling assembly which allows serveral barges to be pulled at one time through the cover handling system by a single barge-pulling machine. This pulling assembly includes a support cellular structure, or any other type of structure, at each end of the continuous barge fendering assembly and an endless cable in the form of a loop. This loop originates at the pulling machine, which is located on one support cellular structure, and extends to a sheave or pulley assembly, which is located on the other support cellular structure. By power rotation of the pulling machine the cable loop is caused to travel between the support cellular structures. Located at intervals along the endless cable are a series of "mules" for attachment of the barges to the endless moving cable. The mules are steel components that are attached to the endless cable loop and are supported in a continuous track.

An additional feature of the present invention is a continuous barge fendering system which is positioned within the crane support structure on both sides of the barges to maintain each individual barge in position at all times during removal and reinstallation of the covers. This system of fenders forms a corridor which guides each individual barge as it is uncovered, loaded or unloaded and finally recovered.

BRIEF DESCRIPTION OF THE DRAWINGS

The advantages of the present invention will become more fully apparent from the description which follows, when read in conjunction with the accompanying drawings wherein.

DESCRIPTION OF THE PREFERRED EMBODIMENTS

Figure 1:
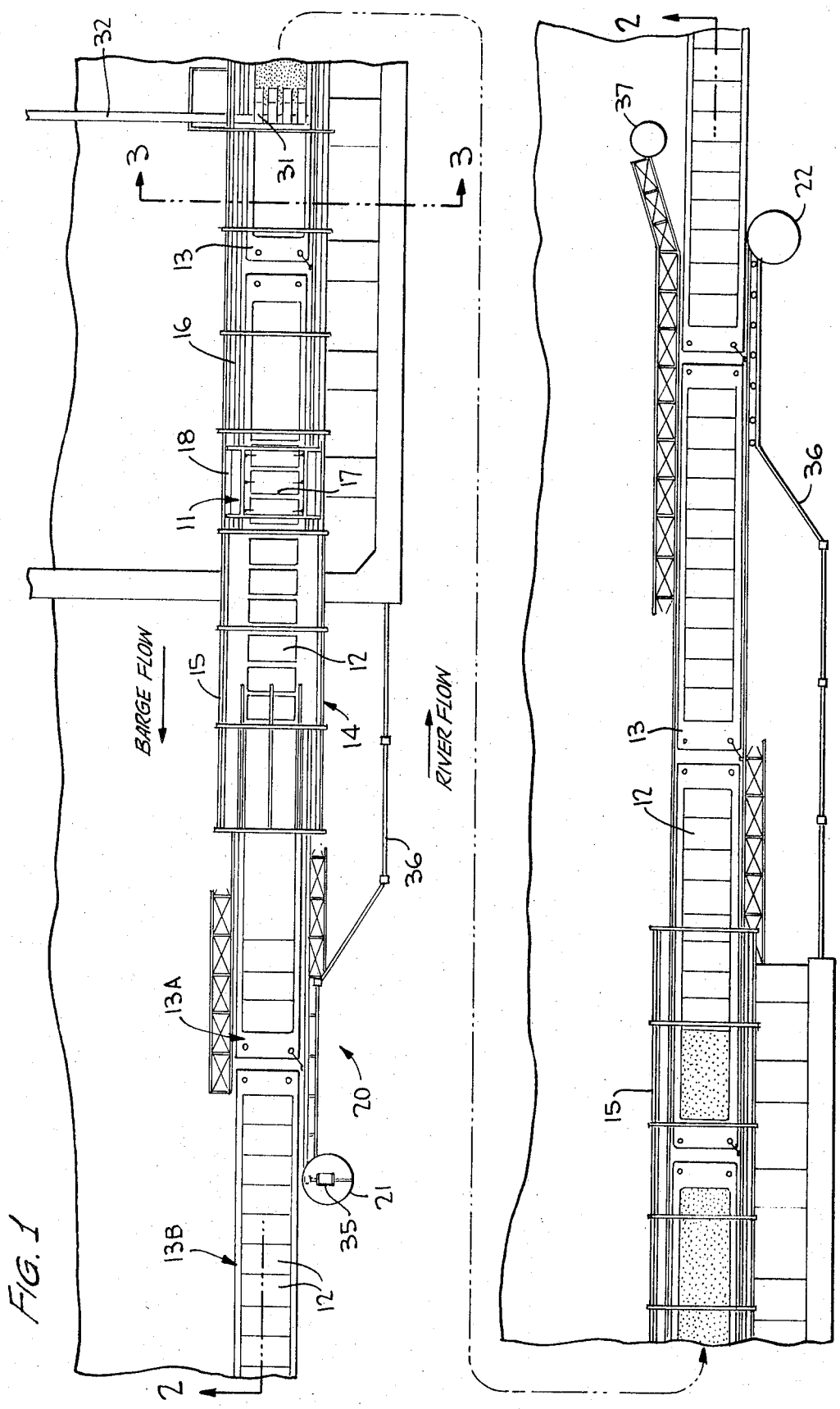
FIG. 1 is a plan view of a barge cover handling system according to the present invention, broken in half for illustrative purposes.
Figure 2:
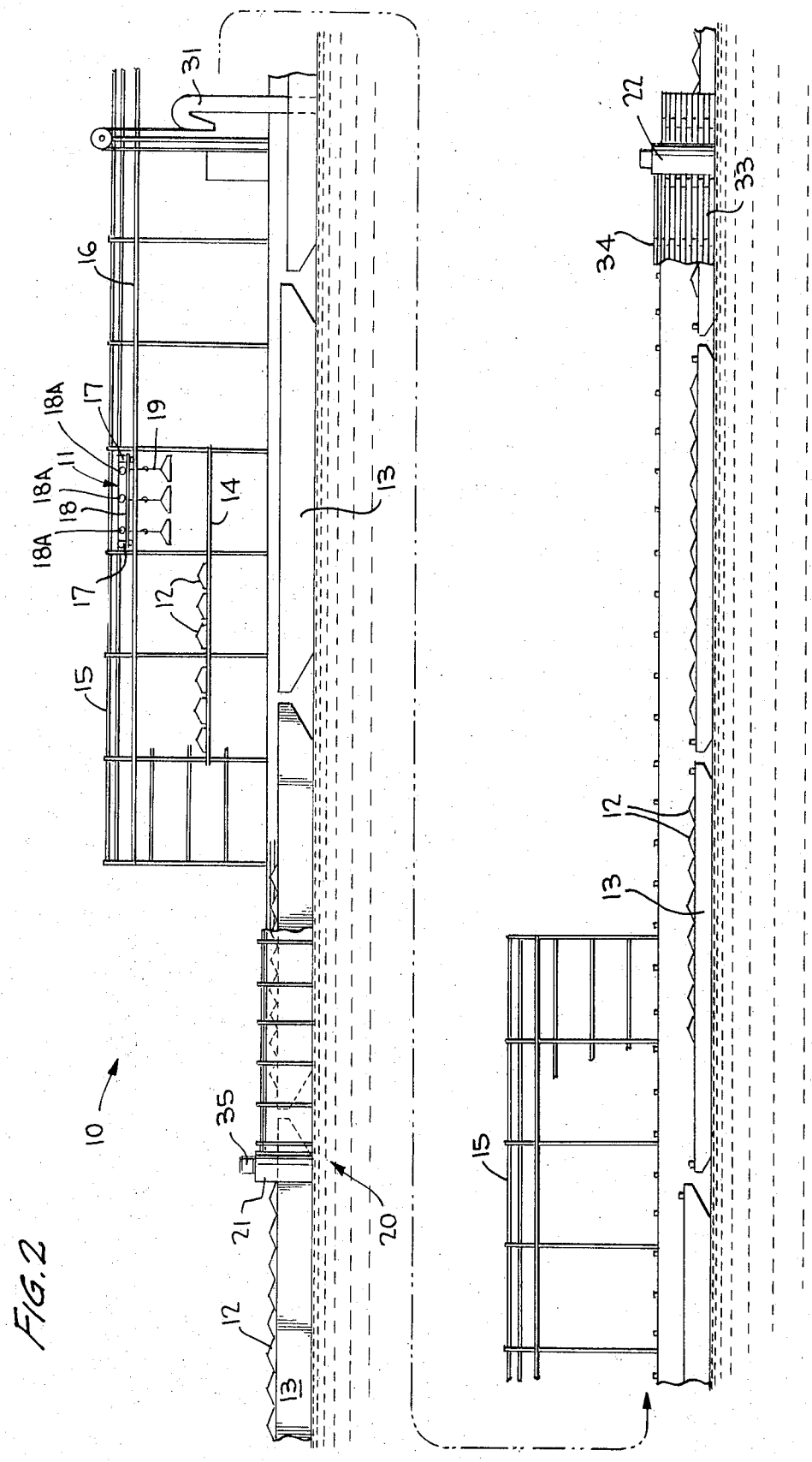
FIG. 2 is a view in elevation taken along lines 2—2 of FIG. 1.
Figure 3:
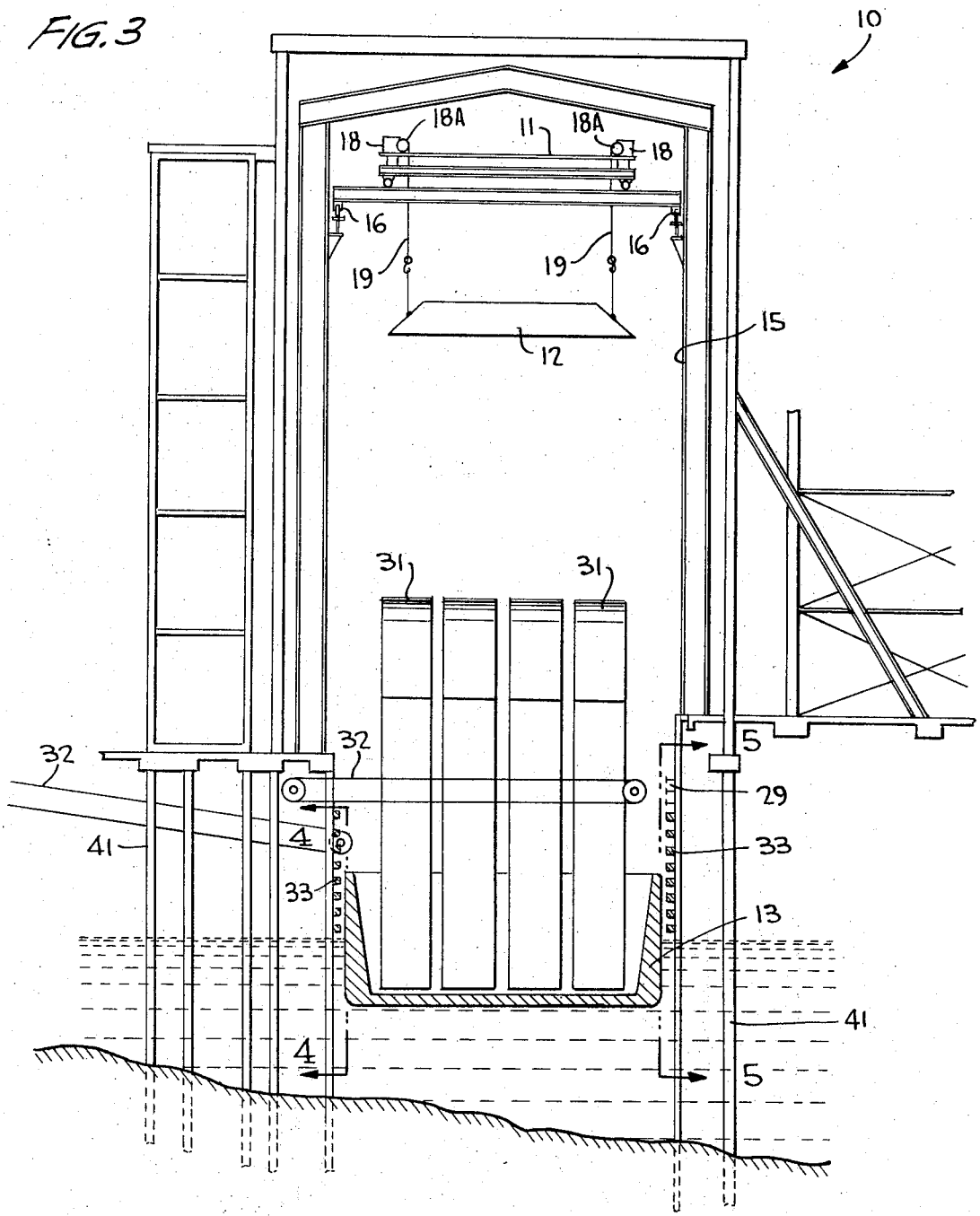
FIG. 3 is an enlarged transverse cross-sectional view taken along lines 3—3 of FIG. 1.

In the illustrated embodiment of the present invention as shown in FIGS. 1, 2 and 3, apparatus 10 is provided for removing and reinstalling covers 12 on floating barges 13. The apparatus 10 includes a crane 11 mounted on a crane support structure 15 which straddles the path of barge travel. FIGS. 1 and 2 show the support structure 15 partially cut away in order to show clearly the other elements of the apparatus of the present invention. The support structure 15 is mounted on pilings 41 driven into the water bottom. The crane 11 is mounted for movement along rails 16 and includes four transverse girder members 17 which are attached to two longitudinal girder members 18 provided with rollers or other means for movement along rails 16. Lifting cables 19 are installed on electric driven drum members 18A to provide means for attachment of the crane to the barge covers 12. Preferably, cable 19 is installed on each electric driven drum 18A, so that the crane is capable of removing from one to three covers 12 from a barge 13 at one time, with the lifting cable 19 on each side of the crane 11 being attached to each cover 12. Upon removal of the covers, the barge may then be loaded or unloaded by means such as marine legs 31 connected to a conveyor system 32.

The number of covers lifted at any one time depends on how the covers are constructed as well as the manner in which the covers are installed upon the barge. Upon removal from the barge, the covers are transported by the crane 11 to a platform 14 for storage. Additional covers may then be removed from the same or a different barge. Since the crane 11 has the capability of handling as many as three covers at one time, in some instances the crane may be employed to remove a single cover from each of three different barges and to transport these covers to the storage platform 14. In removing the covers from a barge, the front covers may be removed first or, alternatively, the middle or rear covers may be removed first, depending upon the position of the barge, its construction and manner of loading. Upon being transported to the storage platform 14, the covers may be stored in stacks of three or four covers per stack on the platform. After the barge cargo has been unloaded, the covers are picked up by the crane 11 from the platform 14 and replaced in their original position on the barge. The barge 13A is shown with three covers replaced in position while barge 13B is shown with all covers having been replaced.

The mechanism for the control of the movement of the crane along the tracks and the mechanism for lifting the cable may be variable speed electric motor drives such as are conventionally used for similar purposes for overhead electric cranes.

From the foregoing description, it will be appreciated that the proximity of the storage platform 14 to the crane 11 provides a definite advantage from the standpoint of speed and economy of operation in the removal and reinstallation of the barge covers.

Figure 7:
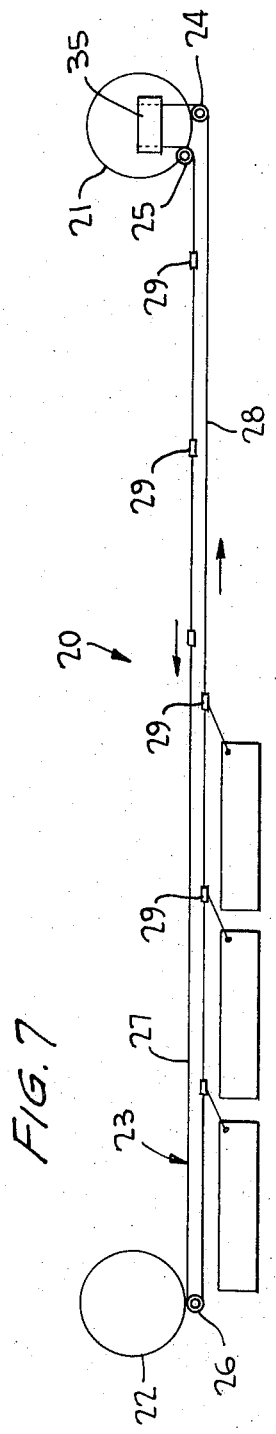
FIGS. 7 and 8 provide a schematic representation of one embodiment of the barge pulling assembly of the present invention.
Figure 8:
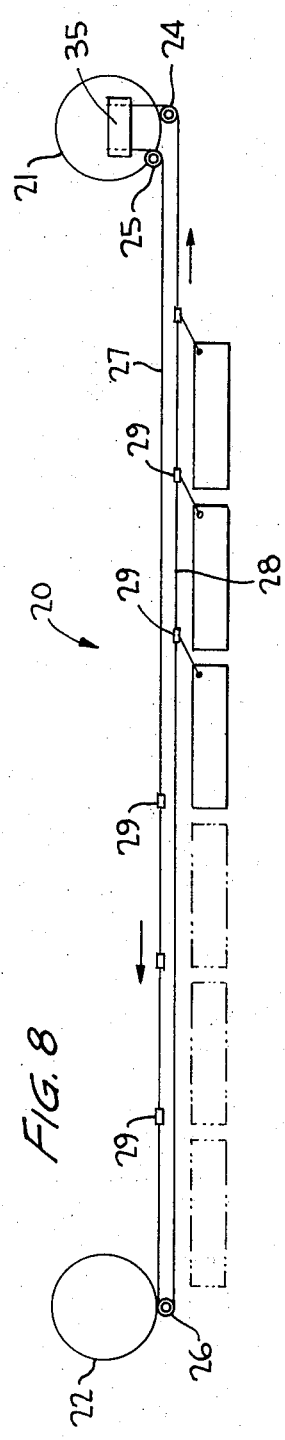

The barge pulling assembly 20, shown in detail in FIGS. 7 and 8, is positioned longitudinally alongside the crane support structure 15 and includes two 30-foot diameter cells 21 and 22 having support means (not shown) extending into the water bottom, the cells 21 and 22 being located adjacent the ends of the crane support structure 15. An endless cable 23, preferably of steel strand construction, is provided in the form of a loop, with the ends of the loop attached to the cells 21 and 22, the cable 23 being wound on sheaves 24 and 25 on the cell 21 having a suitable conventional reversible drive motor 35 for causing the cable 23 to advance around the rotating drum of the barge puller machine on cell 21 and thus travel between the cells 21 and 22. The cable 23, wound around the sheaves 26 attached to cell 22 and the barge puller machine on cell 21 forms an endless loop having an upper 27 and lower 28 line, as shown in FIGS. 5 through 8, the lines thus traveling in opposite directions through continuous guide channels 30, formed of steel or a similar material, which extend the length of the cable 23, during operation of the barge pulling assembly 20.

The sheaves 24 and 25 are in the form of pulley or wheel arrangements, as is sheave 26 attached to cell 22, this latter sheave 26 serving as an end point around which the endless cable 23 travels. Secured to the cable 23 at various points along its length are a series of conventional attachment devices 29 known as mules, of steel or similar material, for attaching an individual barge 13 to the cable 23 in order that the barge 13 may be pulled through the length of the crane support structure 15 for removal of the barge covers, loading or unloading of the barge, and reinstallation of the covers.

In one embodiment, as shown in FIGS. 7 and 8, the cable 23 is provided with a total of six mules with three mules 29 attached to the upper line 27 adjacent one end of the loop and three mules 29 attached to the lower line 28 adjacent the opposite end of the loop. Three barges 13 are attached to the mules on the lower line, as shown in FIG. 7, with the cable 23 traveling in the direction of the arrows. When the leading barge has pulled by the cable 23 to the point where the leading barge reaches its forward most position, the three barges will have then traveled through the barge cover handling system and thus they may be untied from the mules. Three additional barges may then be brought into the new barge positions shown in FIG. 8 and, as the three mules on the other line will have become positioned during travel of the cable 23 at points adjacent the three new barges, the new barges may then be attached to these mules and, by reversing the direction of rotation of the cable 23, the new barges may be caused to move through the barge cover handling system.

Figure 4:
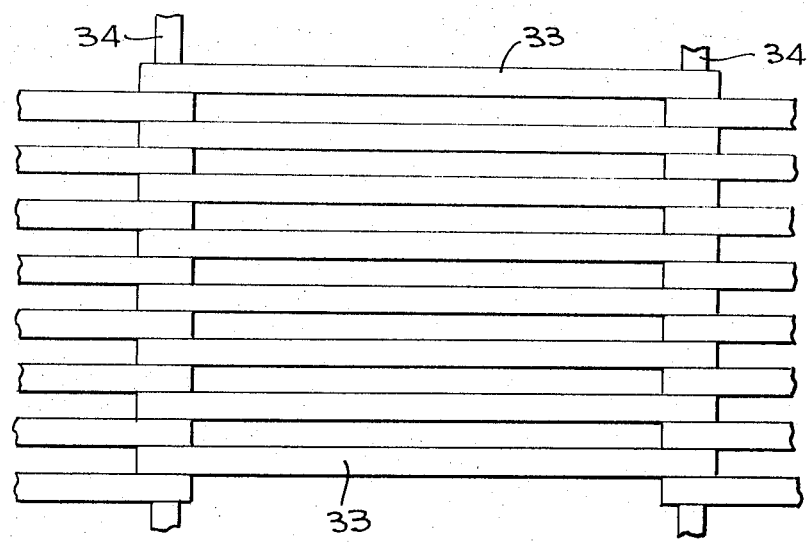
FIG. 4 is an enlarged elevation view taken along lines 4—4 of FIG. 3.
Figure 5:
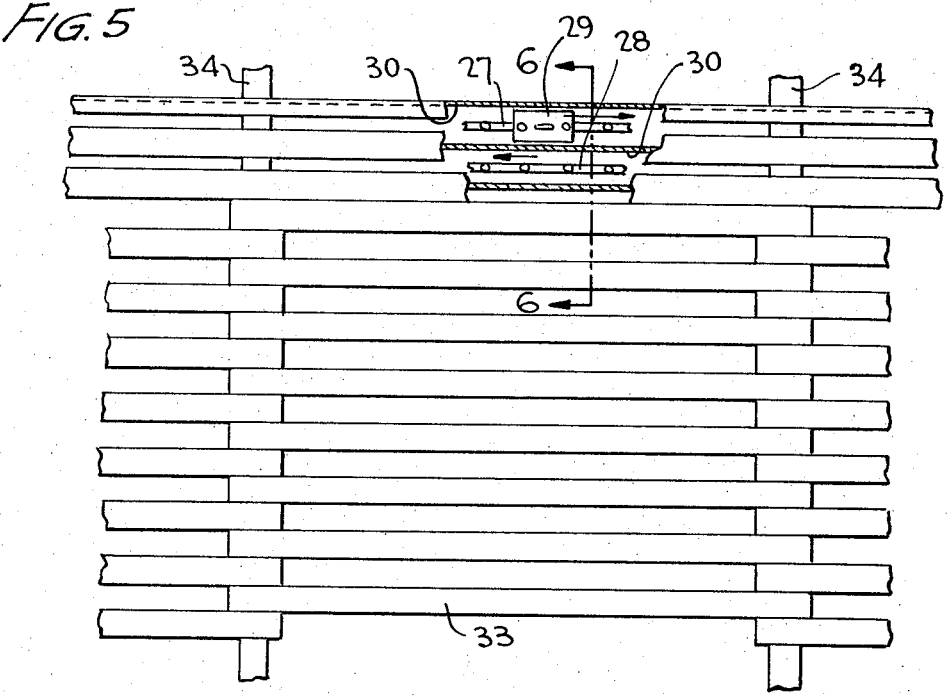
FIG. 5 is a view similar to FIG. 4, taken along lines 5—5 of FIG. 3 partially broken away to show a continuous barge pulling mechanism.
Figure 6:
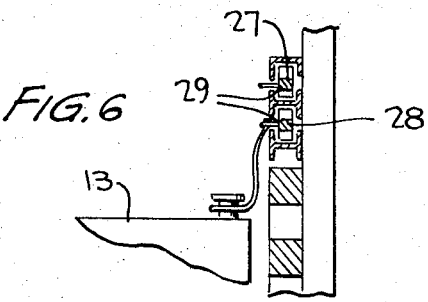
FIG. 6 is a fragmentary sectional view taken along lines 6—6 of FIG. 5.

The continuous barge fendering apparatus which may be employed with the barge cover-handling system of the present invention includes a network made up of a plurality of horizontal members 33, of wood or other durable material, as shown in FIGS. 3, 4 and 5, the members 33 being connected between vertical piles 34 driven into the water bottom. Connected to the tops of the piles 34 are the continuous guide channels 30 which house the upper and lower lines of the cable 23 for the barge pulling assembly.

The fendering network extends continuously along the length of the barge cover handling system along the interior of both side walls of the support structure 15 to form a corridor or alley of a size which will accommodate a single barge 13 and guide the barge through the system as it is uncovered, loaded or unloaded and recovered.

Additional aspects of the system as shown in FIGS. 1 and 2 include a walkway 36 to provide access to various areas of the system and a cell 37 located at the barge entrance to serve as an initial means of guiding the barges into the corridor through the cover handling system.

It is thought that the invention and many of its attendant advantages will be understood from the foregoing description, and will be apparent that various changes may be made in the form, construction and arrangement of the parts without departing from the spirit and scope of the invention or sacrificing all of its material advantages, the forms hereinbefore described being merely preferred embodiments thereof.

It is claimed:

1. Apparatus for removing and replacing covers on a floating barge during loading or unloading operations, comprising:
   a. an elongated support structure having two elevated, spaced apart horizontally disposed guide rails, said support structure having two side portions which extend vertically in parallel planes to define an open-ended corridor which straddles the path along which the barge travels and which is adapted for entry by the barge at one end of the structure and exit of the barge at the opposite end;
   b. a traveling motorized crane mounted for movement along the length of said support structure on said guide rails;
   c. a plurality of lift cables secured to the crane, said cables having means for connecting the cables to a cover on the barge;
   d. means for raising and lowering the lift cables; and
   e. a horizontally-disposed storage platform located on the support structure above the level of the barge so that the barge can travel underneath it.

2. The apparatus of claim 1 further including a barge pulling assembly located alongside the support structure in parallel relationship to the corridor along which the barge travels, said pulling assembly including a pulling machine and associated sheaves connected by an endless cable having a plurality of barge attachment devices secured thereto along the length of the cable, one of said cells being positioned at each end of the structure, reversible drive means being attached to one of said rotatable cells for causing the cable to travel between the cells, one side of said loop forming an upper line of said loop and the other side of said loop forming a lower line of said loop, and upper and lower guide members extending the length of the support structure for housing the upper and lower lines of the loop, respectively.

3. The apparatus of claim 2 wherein a network of fenders is attached to each side portion of the support structure, the network of fenders on each side comprising a plurality of horizontally disposed members connected to spaced vertical support members, each network extending substantially the entire length of the support structure.

4. The apparatus of claim 3 wherein the upper and lower guide members for housing the cable loop are attached to the upper portion of the network of fenders along the side portion of the support structure which is adjacent the barge pulling assembly.

5. The apparatus of claim 1 wherein a network of fenders is attached to each side portion of the support structure, the network of fenders on each side comprising a plurality of horizontally disposed members connected to spaced vertical support members, each network extending substantially the entire length of the support structure.

* * * * *